United States Patent
Raghavan

(10) Patent No.: US 7,701,281 B1
(45) Date of Patent: *Apr. 20, 2010

(54) FLYBACK CAPACITOR LEVEL SHIFTER FEEDBACK REGULATION FOR NEGATIVE PUMPS

(75) Inventor: Vijay Raghavan, Colorado Springs, CO (US)

(73) Assignee: Cypress Semiconductor Corporation, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/107,538

(22) Filed: Apr. 22, 2008

Related U.S. Application Data

(63) Continuation of application No. 11/073,178, filed on Mar. 4, 2005, now Pat. No. 7,362,163.

(60) Provisional application No. 60/556,002, filed on Mar. 23, 2004.

(51) Int. Cl.
  *G04F 1/10* (2006.01)

(52) U.S. Cl. ............... 327/536; 327/537; 327/535

(58) Field of Classification Search .......... 327/534–540
  See application file for complete search history.

(56) References Cited

U.S. PATENT DOCUMENTS

| 5,831,845 | A | | 11/1998 | Zhou et al. |
| 6,069,518 | A | * | 5/2000 | Nakai et al. ............... 327/535 |
| 6,107,862 | A | * | 8/2000 | Mukainakano et al. ...... 327/536 |
| 6,160,440 | A | | 12/2000 | Javanifard et al. |
| 6,809,968 | B2 | * | 10/2004 | Marr et al. ............. 365/185.24 |
| 7,038,954 | B2 | * | 5/2006 | Jung ..................... 365/189.07 |
| 7,362,163 | B1 | * | 4/2008 | Raghavan ................... 327/536 |

OTHER PUBLICATIONS

USPTO Notice of Allowance for U.S. Appl. No. 11/073,178, dated Nov. 29, 2007, 5 pages.
USPTO Final Rejection for U.S. Appl. No. 11/073,178, dated Sep. 12, 2007, 8 pages.
USPTO Final Rejection for U.S. Appl. No. 11/073,178, dated Aug. 21, 2007, 8 pages.
USPTO Non-Final Rejection for U.S. Appl. No. 11/073,178, dated Mar. 13, 2007, 7 pages.
USPTO Final Rejection for U.S. Appl. No. 11/073,178, dated Dec. 8, 2006, 5 pages.
USPTO Non-Final Rejection for U.S. Appl. No. 11/073,178, dated Jun. 6, 2006, 6 pages.

* cited by examiner

*Primary Examiner*—Dinh T. Le

(57) ABSTRACT

Systems and methods of flyback capacitor level shifter feedback regulation for negative pumps. In accordance with a first embodiment of the present invention, a feedback regulator for a negative output charge pump comprises a flyback capacitor for inverting an output of the negative output charge pump to a positive voltage. The feedback regulator further comprises a voltage comparator for comparing the positive voltage to a reference voltage. The voltage comparator is also for producing an enable signal for control of pump driving signals to the negative output charge pump. The feedback regulator further comprises a first plurality of switches for selectively coupling a first terminal of the flyback capacitor between a low voltage and the output and a second plurality of switches for selectively coupling a second terminal of the flyback capacitor between a low voltage and the voltage comparator. Further, the feedback regulator comprises switch control logic for controlling the plurality of switches.

10 Claims, 2 Drawing Sheets

FLYBACK CAPACITOR LEVEL SHIFTER FEEDBACK REGULATION FOR NEGATIVE PUMPS

RELATED APPLICATIONS

This Application claims benefit of U.S. Provisional Patent Application Ser. No. 60/556,002, filed Mar. 23, 2004, entitled "Flyback Capacitor Level Shifter Feedback Regulation Scheme for Negative Pumps" to Vijay Kumar Srinivasa Raghavan, which is hereby incorporated herein by reference in its entirety.

This Application is a CONTINUATION application of, and claims priority to co-pending, commonly owned U.S. patent application Ser. No. 11/073,178, filed Mar. 4, 2005, entitled "Flyback Capacitor Level Shifter Feedback Regulation Scheme for Negative Pumps" to Vijay Kumar Srinivasa Raghavan, which is hereby incorporated herein by reference in its entirety.

FIELD OF THE INVENTION

Embodiments in accordance with the present invention relate generally to electronic circuits, and more particularly to fast and low power flyback capacitor level shifter based feedback regulation circuits, as may be used in charge pump systems.

BACKGROUND

Charge pump circuits are widely used by electronic designers. Charge pumps may be configured as both positive and negative systems. Given a positive reference voltage (for example, a bandgap reference voltage), negative charge pump systems are generally required to level shift the negative output voltage to a positive feedback voltage for comparison with the positive reference voltage for closed loop feedback regulation.

A negative pump system typically comprises a series of charge pump cells. The output of the pump is level shifted and compared with a reference voltage to generate an enable signal for the pump clock drive system. The pump clock drive signal drives the charge pump cells.

In the conventional art using a positive reference voltage, the output of the pump is shifted to a positive voltage so that it can be compared with the (positive) reference voltage in order to control regulation. Conventional art circuits use, for example, resistor divider stacks wherein the highest potential voltage is the positive reference voltage and the negative potential is used as the negative feedback voltage. A supply voltage generally cannot be used as the highest potential in such a resistor divider stack as the negative pump output voltage would then vary with variations in supply voltage. Such variations are especially unsuitable for applications operating under wide supply voltage variations.

Hence, a positive reference voltage is used as the highest potential in the resistor divider stacks of conventional art negative pump systems. Using this technique, a designer can tap a positive level shifted version of the negative feedback voltage that can then be compared with a positive reference in the closed loop system. For such a system to have a desirably fast response to supply voltage variations, the resistor stack should have a low resistance. For example, the reference voltage serving as the highest positive potential in the resistor divider stack must be able to supply current. Unfortunately, typical voltage references are neither designed nor capable of supplying such current loads. For example, such typical voltage references are generally high impedance sources.

To overcome such shortcomings, conventional art systems typically use an operational amplifier buffer in the reference voltage path in order to provide such current loads. Utilizing an operational amplifier in such a manner generally requires an operational amplifier with very fast response characteristics in order for the charge pump feedback system to have desirably fast response and turn-on characteristics.

SUMMARY OF THE INVENTION

Systems and methods of flyback capacitor based level shifter feedback regulation for negative pumps, characterized as having a fast response and operating with low current, for converting a negative output voltage to a level shifted positive value are highly desired.

Accordingly, systems and methods of flyback capacitor level shifter feedback regulation for negative pumps are disclosed. In accordance with a first embodiment of the present invention, a feedback regulator for a negative output charge pump comprises a flyback capacitor for inverting an output of the negative output charge pump to a positive voltage. The feedback regulator further comprises a voltage comparator for comparing the positive voltage to a reference voltage. The voltage comparator is also for producing an enable signal for control of pump driving signals to the negative output charge pump. The feedback regulator further comprises a first plurality of switches for selectively coupling a first terminal of the flyback capacitor between a low voltage and the output and a second plurality of switches for selectively coupling a second terminal of the flyback capacitor between a low voltage and the voltage comparator. Further, the feedback regulator comprises switch control logic for controlling the plurality of switches.

In accordance with another embodiment of the present invention, a positive voltage corresponding to an output of the negative output charge pump is generated. The positive voltage is compared to a positive voltage reference from a high impedance source. Pumping of the negative output charge pump is disabled if the positive voltage is greater than or equal to the positive voltage reference.

Advantages of embodiments in accordance with the present invention include providing an innovative technique to obtain fast and accurate conversion of a negative voltage to its absolute value (corresponding positive value) so that it can be used in a negative pump feedback system with positive reference voltages. Advantageously, this novel method does not require current sourcing capability of the reference voltage, thus making the fast/non-low power operational amplifier based system unnecessary. An additional advantage is that the feedback level shifter circuit is no longer a major factor in the pump turn-on time since no operation amplifiers are employed.

Embodiments in accordance with the present invention are characterized as having a fast response and operating with low current, overcoming numerous disadvantages of the conventional art.

DETAILED DESCRIPTION OF THE INVENTION

In the following detailed description of the present invention, flyback capacitor level shifter feedback regulation for negative pumps, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail so as not to unnecessarily obscure aspects of the present invention.

Flyback Capacitor Level Shifter Feedback Regulation for Negative Pumps

Embodiments in accordance with the present invention are described in the context of design and operation of integrated semiconductors. It is appreciated, however, that elements of the present invention may be utilized in other areas of electronic design and operation.

Figure 1:
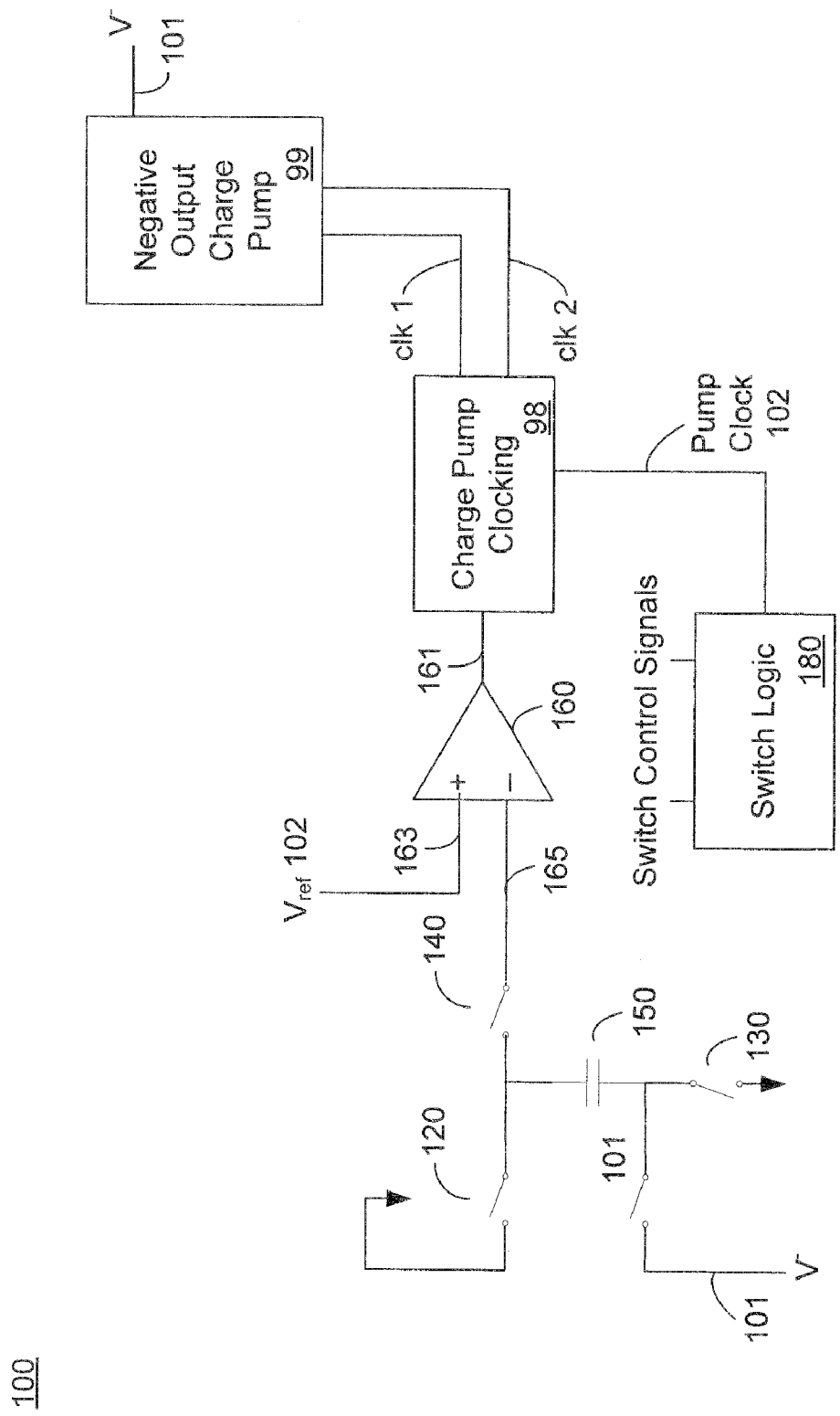
FIG. 1 illustrates a schematic of a novel flyback capacitor level shifter feedback regulation circuit for negative pumps, in accordance with embodiments of the present invention.

FIG. 1 illustrates a schematic of a novel flyback capacitor level shifter feedback regulation circuit 100 for negative pumps, in accordance with embodiments of the present invention. So as to better illustrate the function of feedback regulation circuit 100, FIG. 1 additionally illustrates a charge pump clocking circuit 98 of well known design and a negative output charge pump circuit 99 of well known design. The pump clock drive signals clk1 and clk2, e.g., different phases of a same frequency, of charge pump clocking circuit 98 drive the negative output charge pump circuit 99.

The output voltage of negative output charge pump circuit 99, illustrated as V-101, is coupled to feedback regulation circuit 100. Feedback regulation circuit 100 is provided a reference voltage, Vref 102. Reference voltage Vref 102 is used as a comparison voltage to control the output V-101 of negative output charge pump circuit 99. Reference voltage Vref 102 is typically a positive voltage, and generally of lower absolute value than the absolute value of output V-101. Advantageously, for example, reference voltage Vref 102 may be a bandgap reference voltage of about 1.25 volts.

Feedback regulation circuit 100 comprises four switches, 110, 120, 130 and 140. Feedback regulation circuit 100 further comprises a flyback capacitor 150 and a voltage comparator 160. Feedback regulation circuit 100 optionally comprises a capacitor or other scaling circuitry 170. Switch logic 180 provides control signals to control the action of four switches 110, 120, 130 and 140. Switch logic 180 is typically driven at the pump clocking rate, e.g., via pump clock signal 102. Pump clock signal 102 typically oscillates at the same rate as the pump clocking signals. It is to be appreciated, however, that a duty cycle and/or phase relationship may differ between pump clock signal 102 and the pump clocking signals, e.g., clk1 or clk2.

The function of feedback regulation circuit 100 is now described. The negative pump output V-101 is level shifted using a flyback capacitor technique. During a first portion of the pump cycle, switches 110 and 120 are controlled on, e.g., closed or conducting, while switches 130 and 140 are off, e.g., open or non-conducting. This arrangement of switches causes the "bottom" plate of the flyback capacitor 150, e.g., the terminal coupled to switch 110, to charge to the V-101 voltage.

In a second portion of the pump cycle, switches 110 and 120 are controlled off, while switches 130 and 140 are on. This causes the bottom plate of the flyback capacitor 150 to be coupled to Vss and the top plate of the flyback capacitor 150 to go to a positive voltage equal to the absolute (positive) value of the negative output voltage. The absolute value of the negative voltage can further be scaled via capacitor or other scaling circuitry 170 to compare with the reference voltage Vref 102 supplied to the system.

"When the switch 140 is closed, the voltage on the flyback capacitor 150, a "flyback voltage," is coupled to an input 163 of voltage comparator 160. It is appreciated that the optional scaling circuitry 170 may reduce the voltage originally present on flyback capacitor 150. A second input 165 of voltage comparator 160 is coupled to the reference voltage, Vref 102. It is to be appreciated that no buffering state, e.g., and operations amplifier, need be placed between the source of the reference voltage 102 and the comparator 160. As discussed previously, such buffering stages are deleterious to startup and feedback performance of voltage regulating circuitry."

When the flyback voltage is less than the reference voltage, the output of voltage comparator 160, enable signal 161, enables charge pump clocking circuitry 98 to pump charge pump 99. This action generally causes charge pump 99 to increase the magnitude of its output voltage.

When the flyback voltage is greater than the reference voltage, the output of voltage comparator 160, enable signal 161, disables charge pump clocking circuitry 98. Hence, charge pump 99 is not pumped, and the magnitude of its output voltage is not increased.

The signal(s) generated by switch logic 180 that control the action of the switches should be non-overlapping in such a way that there is no leakage of charge from the flyback capacitor 150. The switches should run at the input pump clock frequency and hence the value of the negative output voltage is updated once every clock cycle. Since this circuit does not require sinking current from the reference voltage, there is advantageously no requirement for a current source capability of the input voltage reference. Further, a high current operational amplifier buffer with fast response characteristics is advantageously not needed, as the input is of high impedance.

A disadvantage of conventional art negative pump systems that utilize high current operational amplifier buffers is that such high current operational amplifier buffers can take approximately five microseconds just for startup. This means that during pump start-up, for example, the output of the high current operational amplifier buffer will not be valid for the first five microseconds. Such a system will have total negative pump startup time of around ten microseconds including startup time of the high current operational amplifier buffer and pumping time (based on a 20 MHz pump). Also, the current consumption of such high current operational amplifier buffers and current sinking resistor divider stack based level shifter is around 300 micro amps.

In contrast, the charge pump circuit 100 of an embodiment in accordance with the present invention may be used in applications where the turn-on time requirement is a maximum of six microseconds. The flyback capacitor technique of level shifting does not involve an operational amplifier, and as a result it can level shift the negative output voltage in less than 25 nanoseconds, even after accounting for non-idealities in switching transistors. The total startup time for such a negative pump system, including the total of flyback level shifter regulation startup time and pumping time (20 MHz pump clock), is on the order of five microseconds. Further, the current consumption of the flyback level shifter regulation circuit is around 50 micro amps.

Figure 2:
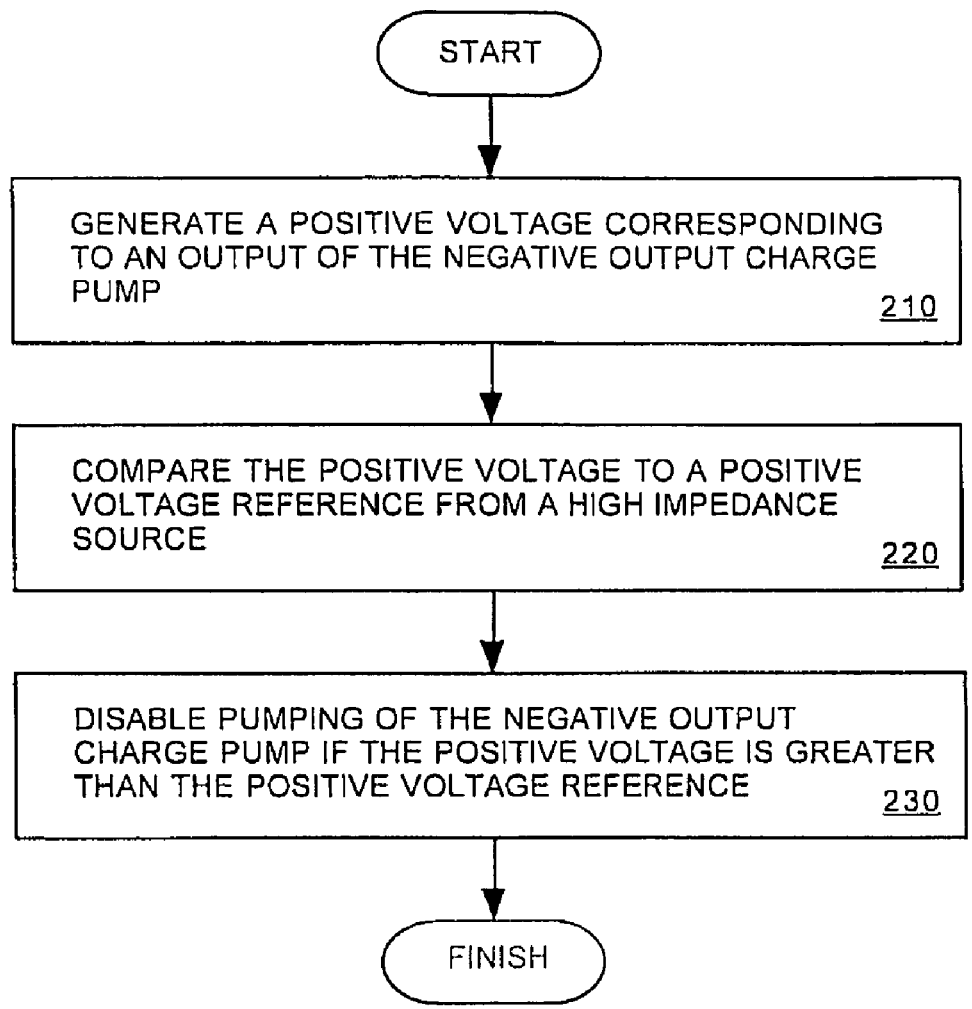
FIG. 2 illustrates an exemplary method for operating a negative output charge pump, in accordance with embodiments of the present invention.

FIG. 2 illustrates an exemplary method 200 for operating a negative output charge pump, in accordance with embodiments of the present invention. In 210, a positive voltage is generated corresponding to an output of the negative output charge pump. The generating may comprise charging a first terminal of a capacitor in a first portion of a cycle with the output of the negative output charge pump and coupling a second terminal of the capacitor to a low voltage and coupling the first terminal of the capacitor in a second portion of the cycle, to the low voltage and accessing the positive voltage at the second terminal of the capacitor. The low voltage may be a local ground reference, e.g., chassis ground, for the charge pump.

In 220, the positive voltage is compared to a positive voltage reference from a high impedance source. The high impedance source may comprise a bandgap reference. In accordance with an alternative embodiment of the present invention, the positive voltage reference is not buffered.

In 230, pumping of the negative output charge pump is disabled if the positive voltage is greater than the positive voltage reference.

In this novel manner, the negative output charge pump is regulated by comparing its output voltage to a reference voltage.

Advantages of embodiments in accordance with the present invention include providing an innovative technique to obtain fast and accurate conversion of a negative voltage to its absolute value (corresponding positive value) so that it can be used in a negative pump feedback system with positive reference voltages. Advantageously, this novel method does not require current sourcing capability of the reference voltage, thus making the fast/non-low power operational amplifier based system unnecessary. An additional advantage is that the feedback level shifter circuit is no longer a major factor in the pump turn-on time since no operation amplifiers are employed.

Embodiments in accordance with the present invention are characterized as having a fast response and operating with low current, overcoming numerous disadvantages of the conventional art.

Embodiments in accordance with the present invention, flyback capacitor level shifter feedback regulation for negative pumps, are thus described. While the present invention has been described in particular embodiments, it should be appreciated that the present invention should not be construed as limited by such embodiments, but rather construed according to the below claims.

What is claimed is:

1. A feedback regulator for a negative output charge pump comprising:

a flyback capacitor for inverting an output of said negative output charge pump to a positive voltage;

a voltage comparator for comparing said positive voltage to a reference voltage and for producing an enable signal for control of pump driving signals to said negative output charge pump;

a first plurality of switches for selectively coupling a first terminal of said flyback capacitor between a low voltage and said output;

a second plurality of switches for selectively coupling a second terminal of said flyback capacitor between a low voltage and said voltage comparator; and switch control logic for controlling said plurality of switches.

2. The feedback regulator of claim 1 wherein said enable signal controls said pump driving signals.

3. The feedback regulator of claim 1 wherein said switch control logic operates at the same frequency as said pump driving signals.

4. The feedback regulator of claim 1 wherein no more than one switch of said first second plurality of switches is in a conductive condition at a time.

5. The feedback regulator of claim 1 further comprising a scaling circuit to scale said positive voltage prior to input to said voltage comparator.

6. The feedback regulator of claim 5 wherein said scaling circuit comprises a capacitor.

7. The feedback regulator of claim 1 wherein said low voltage comprises a local ground reference for said feedback regulator.

8. A method of operating a negative output charge pump comprising:

generating a positive voltage corresponding to an of said negative output charge pump;

comparing said positive voltage to a positive voltage reference from a high impedance source; and disabling pumping of said negative output charge pump if said positive voltage is greater than said positive voltage reference;

wherein said generating comprises:

in a first portion of a cycle, charging a first terminal of a capacitor with said output of said negative output charge pump and coupling a second terminal of said capacitor to a low voltage; and in a second portion of said cycle, coupling said first terminal of said capacitor to said low voltage and accessing positive voltage at said second terminal of said capacitor; and wherein said cycle corresponds to said pumping of said negative output charge pump.

9. The method of claim 8 wherein said first and second portions of said cycle do not temporarily overlap.

10. The method of claim 8 wherein said low voltage comprises a local ground reference for said negative output charge pump.

* * * * *